United States Patent
Jeong et al.

(10) Patent No.: US 10,488,571 B2
(45) Date of Patent: Nov. 26, 2019

(54) POLARIZING PLATE, METHOD OF MANUFACTURING THE SAME, AND OPTICAL DISPLAY COMPRISING THE SAME

(71) Applicant: SAMSUNG SDI CO., LTD., Yongin-si, Gyeonggi-do (KR)

(72) Inventors: Woo Jin Jeong, Suwon-si (KR); Seung Jun Lee, Suwon-si (KR)

(73) Assignees: Samsung SDI Co., Ltd., Yongin-si (KR); Samsung Electronics Co., Ltd., Suwon-si (KR)

(*) Notice: Subject to any disclaimer, the term of this patent is extended or adjusted under 35 U.S.C. 154(b) by 559 days.

(21) Appl. No.: 15/186,207

(22) Filed: Jun. 17, 2016

(65) Prior Publication Data

US 2016/0370508 A1 Dec. 22, 2016

(30) Foreign Application Priority Data

Jun. 18, 2015 (KR) .................. 10-2015-0086942

(51) Int. Cl.
*G02B 5/30* (2006.01)
*G02B 1/14* (2015.01)
(Continued)

(52) U.S. Cl.
CPC .............. *G02B 5/3033* (2013.01); *C09J 7/22* (2018.01); *C09J 7/35* (2018.01); *G02B 1/14* (2015.01);
(Continued)

(58) Field of Classification Search
CPC .................. G02B 1/14; G02B 5/3033
(Continued)

(56) References Cited

U.S. PATENT DOCUMENTS

2011/0014410 A1* 1/2011 Kishioka ............. C08F 220/18
428/41.8
2011/0111220 A1* 5/2011 Takarada ............... C09J 7/385
428/345

(Continued)

FOREIGN PATENT DOCUMENTS

JP 2006-291027 A 10/2006
JP 2013-072951 A 4/2013
(Continued)

OTHER PUBLICATIONS

Korean Office action in corresponding Korean Application No. 10-2015-0086942, Korean Office action dated May 16, 2017 (8 pgs.).

(Continued)

*Primary Examiner* — Ricky D Shafer
(74) *Attorney, Agent, or Firm* — Lewis Roca Rothgerber Christie LLP

(57) ABSTRACT

A polarizing plate, a method of manufacturing the same, and an optical display including the same are provided. A polarizing plate includes a polarizer and a first adhesive layer formed on a lower surface of the polarizer, and the first adhesive layer includes an adhesive resin having a glass transition temperature of about 50° C. or greater, and the first adhesive layer has a haze of about 1% or less at a wavelength of about 380 nm to about 780 nm.

13 Claims, 1 Drawing Sheet

(51) Int. Cl.
   *C09J 7/35*   (2018.01)
   *C09J 7/22*   (2018.01)
(52) U.S. Cl.
   CPC ...... *C09J 2201/36* (2013.01); *C09J 2201/622* (2013.01); *C09J 2203/318* (2013.01); *C09J 2205/114* (2013.01); *C09J 2429/006* (2013.01); *C09J 2433/00* (2013.01)
(58) Field of Classification Search
   USPC .................................................. 359/487.02
   See application file for complete search history.

(56) References Cited

U.S. PATENT DOCUMENTS

| | | | | |
|---|---|---|---|---|
| 2011/0253301 | A1* | 10/2011 | Yamanaka | B32B 7/12 156/247 |
| 2012/0064275 | A1* | 3/2012 | Fumoto | C09J 7/40 428/41.5 |
| 2012/0270041 | A1* | 10/2012 | Matsumoto | C09J 133/066 428/354 |
| 2013/0085215 | A1* | 4/2013 | Shitara | C09J 7/00 524/100 |
| 2014/0162044 | A1* | 6/2014 | Lee | C09J 133/066 428/220 |
| 2014/0186604 | A1* | 7/2014 | Kim | C09J 7/10 428/220 |
| 2015/0315431 | A1* | 11/2015 | Yu | C09J 7/00 522/26 |
| 2016/0289517 | A1* | 10/2016 | Shin | C08F 265/06 |
| 2017/0015880 | A1* | 1/2017 | Kim | C09J 7/22 |
| 2017/0306194 | A1* | 10/2017 | Kwak | B32B 7/12 |

FOREIGN PATENT DOCUMENTS

| | | |
|---|---|---|
| KR | 10-2013-0020618 A | 2/2013 |
| TW | 2009-37053 A | 9/2009 |
| TW | 2013-25895 A1 | 7/2013 |
| TW | 2013-29532 A1 | 7/2013 |
| WO | WO 2015/076101 A1 | 5/2015 |

OTHER PUBLICATIONS

Taiwan Office action in corresponding Taiwan Application No. 105119019, Taiwan Office action dated May 17, 2017 (8 pgs.).

* cited by examiner

POLARIZING PLATE, METHOD OF MANUFACTURING THE SAME, AND OPTICAL DISPLAY COMPRISING THE SAME

CROSS-REFERENCE TO RELATED APPLICATION

This application claims priority to and the benefit of Korean Patent Application No. 10-2015-0086942, filed on Jun. 18, 2015 in the Korean Intellectual Property Office, the entire content of which is incorporated herein by reference.

BACKGROUND

1. Field

Aspects of embodiments of the present invention relate to a polarizing plate, a method of manufacturing the same, and an optical display including the same.

2. Description of the Related Art

A polarizing plate is provided to an optical display to prevent reflection of external light or to polarize light emitted from a light source. The optical display may include a liquid crystal display, an organic light emitting display, or a flexible organic light emitting display, for example. Recently, quantum dots have been applied to the optical display in order to improve color reproduction and visibility.

Recently, a polarizing plate has been manufactured to a reduced thickness by forming a protective film only on one surface of a polarizer. The polarizing plate having the protective film formed only on one surface of the polarizer can suffer from deterioration in durability due to infiltration of external moisture through the other surface of the polarizer and can also suffer from deterioration in crack resistance of the polarizer under thermal impact conditions. To overcome these problems, an adhesive layer is formed on the other surface of the polarizer such that the polarizing plate can be secured to an optical device in the optical display via the adhesive layer in order to improve durability and crack resistance of the polarizing plate. The adhesive layer needs to improve durability and crack resistance of the polarizing plate while exhibiting good transparency so as to be used in the optical display. In addition, with the recent development of flexible displays, studies into improving flexibility of the polarizing plate are also continuing.

Some background to the technique of the present invention is disclosed in Japanese Patent Publication No. 2013-072951 A and the like.

SUMMARY

In accordance with an aspect of one or more embodiments of the present invention, a polarizing plate includes a polarizer and a first adhesive layer formed on a lower surface of the polarizer wherein the first adhesive layer includes an adhesive resin having a glass transition temperature of about 50° C. or greater and the first adhesive layer has a haze of about 1% or less at a wavelength of about 380 nm to about 780 nm.

In accordance with another aspect of one or more embodiments of the present/invention, a polarizing plate includes a polarizer and a first adhesive layer formed on a tower surface of the polarizer, wherein the first adhesive layer includes an adhesive resin having a glass transition temperature of about 50° C. or greater and a polyisocyanate curing agent modified with an allophanate group.

In accordance with a further aspect of one or more embodiments of the present invention, a polarizing plate includes a polarizer; a protective layer formed on an upper surface of the polarizer; a first adhesive layer formed on a lower surface of the polarizer, and a second adhesive layer formed on a lower surface of the first adhesive layer, wherein the first adhesive layer includes an adhesive resin having a glass transition temperature of about 50° C. or more and the first adhesive layer has a haze of about 1% or less at a wavelength of about 380 nm to about 780 nm.

In accordance with yet another aspect of one or more embodiments of the present invention, a method of manufacturing a polarizing plate includes: concurrently (e.g., simultaneously) coating a composition for a second adhesive layer and a composition for a first adhesive layer, followed by drying to form a stack structure comprising a sheet for the first adhesive layer and a sheet for the second adhesive layer therein; laminating the sheet for the first adhesive layer with a surface of a polarizer; and curing the sheet for the second adhesive layer and the sheet for the first adhesive layer.

In accordance with yet another aspect of one or more embodiments of the present invention, an optical display includes a polarizing plate as set forth above.

DETAILED DESCRIPTION

Figure 1:
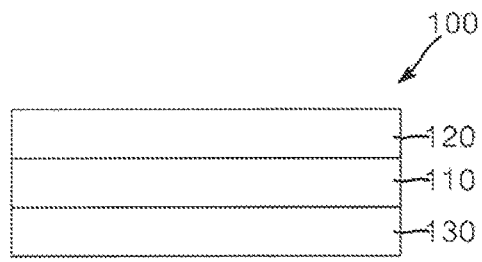
FIG. 1 is a cross-sectional view of a polarizing plate according to an embodiment of the present invention.

Hereinafter, some embodiments of the present invention will be described in further detail with reference to the accompanying drawings. It should be understood that the present invention is not limited to the following embodiments and may be embodied in different ways, and that the following embodiments are given to provide disclosure of the invention and to provide a thorough understanding of the invention to those skilled in the art. It should be noted that the drawings may not be to precise scale, and some of the dimensions, such as width, length, thickness, and the like, may be exaggerated for clarity of description in the drawings. In the drawings, like components are denoted by like reference numerals.

As used herein, spatially relative terms such as "upper" and "lower" are defined with reference to the accompanying drawings. Thus, it will be understood that "upper" can be used interchangeably with "lower." In addition, it will be understood that when a layer is referred to as being "on" another layer, it can be directly formed on the other layer, or one or more intervening layers may also be present. By contrast, it will be understood that when a layer is referred to as being "directly on" another layer, no intervening layer is interposed therebetween.

As used herein, "tensile modulus" is measured in accordance with ASTM D882.

As used herein, "peel strength" is measured in accordance with JIS2107 and means 180° peel strength between a first adhesive layer or second adhesive layer and a glass substrate.

As used herein, the term "radius of curvature" at a point of a rounded section generated upon bending a polarizing plate is defined by a radius of an imaginary contact circle at the corresponding point of the rounded section in which the imaginary contact circle is closer to the rounded section than any other imaginary circles.

As used herein, the term "(meth)acryl" refers to acryl and/or methacryl.

As used herein, the term "substituted" in "substituted or unsubstituted" means that at least one hydrogen atom in a corresponding functional group is substituted with a $C_1$ to $C_{10}$ alkyl group, an amino group, a $C_6$ to $C_{10}$ aryl group, a halogen atom, a cyano group, a $C_3$ to $C_{10}$ cycloalkyl group, or a $C_7$ to $C_{10}$ arylalkyl group.

A polarizing plate according to an embodiment of the present indention will be described with reference to FIG. 1. FIG. 1 is a cross-sectional view of a polarizing plate according to an embodiment of the present invention.

Referring to FIG. 1, a polarizing plate 100 according to an embodiment of the present invention may include a polarizer 110, a protective layer 120, and a first adhesive layer 130. The polarizing plate 100 may include the protective layer 120 only on one surface of the polarizer 110. Since the polarizing plate 100 includes the first adhesive layer 130, the polarizing plate 100 can secure durability upon fracture or severe conditions in reworking, can prevent or substantially prevent generation of cracks in the polarizer 110 and/or discoloration of the polarizer 110 under high temperature and/or high humidity conditions or under thermal impact conditions, and can provide thickness reduction of an optical display through thickness reduction of the polarizing plate 100.

The polarizing plate 100, according to an embodiment, may have a thickness of about 115 μm or less, and, in one embodiment, about 108 μm or less, and, in one embodiment, about 47 μm to about 100 μm. Within this thickness range, the polarizing plate can be used in optical displays and can assist in thickness reduction thereof. The polarizing plate 100 may have a light transmittance of about 30% or more, and, in one embodiment, about 30% to about 50%; and, in one embodiment, about 40% to about 50%, at a wavelength of about 380 nm to about 780 nm. The polarizing plate 100 may have a polarization degree of about 90% or more, and, in one embodiment, about 95.000% to about 99.990%. Within these ranges of light transmittance and polarization degree, the polarizing plate can be used in optical displays.

The polarizer 110, the protective layer 120, and the first adhesive layer 130 according to an embodiment, and methods of manufacturing these components will be described in further detail.

The polarizer 110 is disposed between the protective layer 120 and the first adhesive layer 130 and can polarize light entering the polarizing plate 100.

One surface of the polarizer 110 adjoining the first adhesive layer 130 may be subjected to or treated by at least one of corona treatment, plasma treatment, and primer treatment. As a result, peel strength between the polarizer 110 and the first adhesive layer 130 is increased, thereby preventing or substantially preventing separation between the polarizer 110 and the first adhesive layer 130. Corona treatment, plasma treatment, or primer treatment of the polarizer 110 may be performed by a typical method used in the art.

The polarizer 110 may have a thickness of about 5 μm to about 30 μm, and, in one embodiment, about 5 μm to about 20 μm. Within this thickness range, the polarizer can be used in the polarizing plate and can realize thickness reduction of the polarizing plate.

The polarizer 110 may be manufactured using a polyvinyl alcohol resin film. In an embodiment, the polarizer 110 may be a polyvinyl alcohol polarizer manufactured by absorbing at least one of iodine and dichroic dyes to the polyvinyl alcohol resin film, or a polyene-based polarizer manufactured by dehydrating the polyvinyl alcohol resin film. The polyvinyl alcohol resin film may have a degree of saponification of about 85 mol % to about 100 mol %, and, in one embodiment, about 98 mol % to about 100 mol %. The polyvinyl alcohol resin film may have a degree of polarization of about 1,000 to about 10,000, and, in one embodiment, about 1,500 to about 10,000. Within these ranges of saponification and polarization degrees, the polyvinyl alcohol resin film can be used in fabrication of the polarizer. The polarizer 110 may be manufactured by a typical method known in the art.

The protective layer 120 may be formed on one surface of the polarizer 110 to protect the polarizer 110. The protective layer 120 may be a protective film or a protective coating layer.

In one embodiment, the protective layer 120 may be realized by a protective film formed of an optically transparent resin. In an embodiment, the optically transparent resin may include at least one selected from among cyclic polyolefin resins such as an amorphous cyclic olefin polymer (COP), polyester resins, such as poly(meth)acrylate resins, polycarbonate resins and polyethylene terephthalate (PET), cellulose ester resins such as triacetylcellulose (TAC), polyethersulfone resins, polysulfone resins, polyamide resins, polyimide resins, non-cyclic polyolefin resins, polyarylate resins, polyvinyl alcohol resins, polyvinyl chloride resins, and polyvinylidene resins. In one embodiment, the protective film may be a monolayer film formed of one kind of polyester resin.

The protective film may have a thickness of about 5 μm to about 200 μm, and, in one embodiment, about 10 μm to about 150 μm, and, in one embodiment, about 20 μm to about 100 μm. Within this thickness range, the protective film can be used in the polarizing plate and can suppress warpage of the polarizing plate together with the first adhesive layer. Although not shown in FIG. 1, the protective film may be bonded to the polarizer 110 via a typical bonding agent for polarizing plates, for example, a water-based bonding agent or a photocurable bonding agent. In an embodiment, the water-based bonding agent may be a mixture of water with a compound, such as polyvinyl alcohol, polyethylene imine, and zirconium oxide. The photocurable bonding agent may be a mixture including at least one of an epoxy resin and a (meth)acrylate resin.

In another embodiment, the protective layer 120 may be realized by a protective coating layer. The protective coating layer may be formed of an active energy ray curable resin composition including an active energy ray curable compound and an initiator.

The protective coating layer may have a thickness of about 5 μm to about 200 μm, and, in one embodiment, about 6 μm to about 20 μm, and, in one embodiment, about 4 μm to about 10 μm. Within this thickness range, the protective coating layer can be used in the polarizing plate, can suppress warpage of the polarizing plate together with the first adhesive layer, and; can assist in thickness reduction of the polarizing plate. The protective coating layer may be directly formed on the polarizer 110. As used herein, the expression "directly formed" means that there is no adhesive layer and/or no bonding layer interposed between the polarizer and the protective coating layer.

In one or more embodiments, although not shown in FIG. 1, the protective layer 120 may further include a functional coating layer on an upper surface of the protective layer 120 to provide an additional function to the polarizing plate. In an embodiment, the functional coating layer may include at least one of a hard coating layer, an antireflective layer, an anti-fingerprint layer, an antistatic layer, and/or a low reflection layer, without being limited thereto. The functional coating layer may have a thickness of about 1 μm to about 100 μm, and, in one embodiment, about 1 μm to about 50 μm. Within this thickness range, the functional coating layer can provide additional functions to the polarizing plate without affecting the other protective layer and can be used in the polarizing plate.

Although not shown in FIG. 1, in an embodiment wherein the protective layer 120 is realized by the protective film, the polarizing plate may further include a primer layer formed on a lower surface of the protective layer 120 to improve bonding between the polarizer 110 and the protective layer 120. The primer layer may be a hydrophilic surface modification layer. The primer layer may be formed by coating a composition including a resin for formation of the primer layer, which includes a hydrophilic group and a hydrophobic group. The resin for formation of the primer layer may include at least one of a polyester resin and a polyvinyl acetate resin. The primer layer may have a thickness of about 1 nm to about 100 nm, and, in one embodiment, about 1 nm to about 50 nm. Within this thickness layer, the primer layer can improve adhesion to the polarizer while improving total light transmittance.

The first adhesive layer 130 may be formed on the other surface of the polarizer 110 such that the polarizing plate 100 can be adhered to an optical device of an optical display, for example, a liquid crystal display panel, an organic light emitting device, a transparent conductive film, or the like, therethrough.

The first adhesive layer 130 acts as a barrier layer disposed on the polarizer 110 at an opposite side to the protective layer 120 to protect the polarizer 110 from external environmental factors, such as moisture and gas. Further, the first adhesive layer 130 can provide durability upon or against fracture or severe conditions in reworking, can prevent or substantially prevent generation of cracks in the polarizer 110 and/or discoloration of the polarizer 110 under high temperature and/or high humidity conditions or under thermal impact conditions, and can assist in thickness reduction of the polarizing plate as compared with typical polarizing plates.

The first adhesive layer 130 exhibits sufficient adhesion to the polarizer 110 and is directly formed on the polarizer 110, thereby enabling thickness reduction of the polarizing plate. As used herein, the expression "directly formed" means that there is no adhesive layer and/or no bonding layer interposed between the polarizer 110 and the first adhesive layer 130. In one or more embodiments, in order to improve adhesion between the polarizer and the first adhesive layer, the other surface of the polarizer may be subjected to or treated by primer treatment, corona treatment, and/or plasma treatment by a thickness of 1 μm or less.

The first adhesive layer 130 may have a thickness of about 5 μm to about 40 μm, and, in one embodiment, about 5 μm to about 20 μm. Within this thickness range, the first adhesive layer can be used in an optical display and can realize thickness reduction of the polarizing plate.

Figure 2:
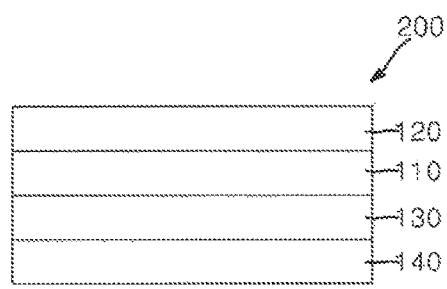
FIG. 2 is a cross-sectional view of a polarizing plate according to another embodiment of the present invention.

The first adhesive layer 130 may include an adhesive resin having a glass transition temperature of about 50° C. or greater. Thus, the first adhesive layer 130 has high tensile modulus to prevent or substantially prevent permeation of external moisture, and thus can be easily formed while improving durability of the polarizing plate. In another embodiment, as shown in FIG. 2, in a structure wherein the polarizing plate further includes a second adhesive layer 140 on a lower surface of the first adhesive layer 130, the first adhesive layer 130 and the second adhesive layer 140 may be formed by concurrent (e.g., simultaneous) coating. Accordingly, adhesion between the first adhesive layer 130 and the second adhesive layer 140 can be further improved and roundness at an interface between the first adhesive layer 130 and the second adhesive layer 140 can be minimized or reduced, thereby further improving light transmittance of the polarizing plate.

In an embodiment, the first adhesive layer 130 may have a tensile modulus of about 10 MPa to less than about 2,000 MPa, and, in one embodiment, about 50 MPa to about 1500 MPa, and, in one embodiment, about 200 MPa to about 1500 MPa. Within this range, the first adhesive layer can act as an effective barrier with respect to the polarizer.

The first adhesive layer 130 may be formed of a composition for the first adhesive layer, which includes an adhesive resin having a glass transition temperature of about 50° C. or greater and an isocyanate-based curing agent described below. As a result, the first adhesive layer 130 has low haze to reduce haze of the polarizing plate, can exhibit good flexibility, and can realize good durability for the polarizing plate. In an embodiment, the first adhesive layer 130 may have a haze of about 1% or less, and, in one embodiment, about 0.1% to about 0.5%, and, in one embodiment, about 0.1% to about 0.2%, at a wavelength of about 380 nm to about 780 nm. In an embodiment, the polarizing plate 100 may have a haze of about 1% or less, and, in one embodiment, about 0.1% to about 0.5%, and, in one embodiment, about 0.1% to about 0.3%, at a wavelength of about 380 nm to about 780 nm. Within this haze range, the first adhesive layer can be used in an optical display. With such a first adhesive layer, the polarizing plate 100 exhibits good flexibility to have a radius of curvature of about 10 mm or less, and, in one embodiment, about 1 mm to about 5 mm, and thus can be used in a flexible display.

The first adhesive layer 130 may be formed of a composition for the first adhesive layer, which includes an adhesive resin having a glass transition temperature of about 50° C. or greater and a large amount of an isocyanate-based curing agent described below. Accordingly, the first adhesive layer 130 has a high tensile modulus to prevent or substantially prevent permeation of external moisture. Further, the first adhesive layer 130 can secure the tensile modulus in the above range upon heat curing or room temperature curing of the composition for the first adhesive layer without a heat curable initiator, and can provide adhesive strength with respect to the polarizer 110 subjected to plasma, corona, or plasma treatment, thereby preventing or substantially preventing separation between the polarizer 110 and the first adhesive layer 130. In one embodiment, the first adhesive layer 130 may have a peel strength of about 1,000 gf/inch to about 1800 gf/inch. Within this range of peel strength, the first adhesive layer can exhibit sufficient strength with respect to the polarizer, thereby preventing or substantially preventing separation between the polarizer 110 and the first adhesive layer 130.

The first adhesive layer 130 may be formed through heat curing or room temperature curing of the composition for the first adhesive layer. Heat curing includes annealing the composition for the first adhesive layer at about 35° C. to about 50° C. and about 20% to about 80% RH (relative humidity), and, in one embodiment, about 35° C. and about 45% RH, for about 24 hours to about 48 hours. Room temperature curing includes annealing the composition for the first adhesive layer at about 20° C. to less than about 35° C. and about 20% to about 60% RH for about 24 hours to about 48 hours.

Next, the composition for the first adhesive layer will be described in further detail.

The composition for the first adhesive layer may include the adhesive resin having a glass transition temperature of about 50° C. or greater (hereinafter, simply referred to as "adhesive resin") and the isocyanate-based during agent. The composition for the first adhesive layer does not include a heat curable initiator. Although the composition for the first adhesive layer does not include the heat curable initiator, the composition includes a large amount of the isocyanate-based curing agent, thereby realizing an adhesive layer having high tensile modulus and high adhesive strength.

The adhesive resin may be a binder that forms the first adhesive layer through heat curing and/or room temperature curing. Within the glass transition temperature range, the adhesive resin can exhibit high tensile modulus, thereby realizing an adhesive layer acting as a barrier layer. The adhesive resin may have a glass transition temperature of about 50° C. or greater, and, in one embodiment, about 50° C. to about 80° C., and, in one embodiment, about 50° C. to about 70° C., and, in one embodiment, about 50° C. to about 60° C.

The adhesive resin may include a (meth)acrylic copolymer, without being limited thereto. The (meth)acrylic copolymer may include a copolymer of a (meth)acrylic monomer mixture.

The (meth)acrylic monomer mixture may include at least one selected from among a substituted or unsubstituted $C_1$ to $C_{20}$ alkyl group-containing (meth)acrylic monomer, a hydroxyl group-containing (meth)acrylic monomer, a substituted or unsubstituted $C_3$ to $C_{20}$ cycloalkyl group-containing (meth)acrylic monomer, and a substituted or unsubstituted $C_6$ to $C_{20}$ aromatic group-containing (meth)acrylic monomer. These may be used alone or in combination thereof.

The substituted or unsubstituted $C_1$ to $C_{20}$ alkyl group-containing (meth)acrylic monomer may include a $C_1$ to $C_{20}$ alkyl group-containing (meth)acrylic ester, in which the $C_1$ to $C_{20}$ alkyl group may be substituted or unsubstituted. For example, the $C_1$ to $C_{20}$ alkyl group-containing (meth)acrylic ester may include at least one selected from among methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto.

The substituted or unsubstituted $C_3$ to $C_{20}$ cycloalkyl group-containing (meth)acrylic monomer may include a $C_3$ to $C_{20}$ cycloalkyl group-containing (meth)acrylic ester, in which the $C_3$ to $C_{20}$ cycloalkyl group may be substituted or unsubststuted. For example, the $C_3$ to $C_{20}$ cycloalkyl group-containing (meth)acrylic ester may include at least one of cyclopentyl (meth)acrylate, cyclohexyl (meth)acrylate, and isobornyl (meth)acrylate.

The substituted or unsubstituted $C_6$ to $C_{20}$ aromatic group-containing (meth)acrylic monomer may include a $C_6$ to $C_{20}$ aromatic group-containing (meth)acrylic ester, in which the $C_6$ to $C_{20}$ aromatic group may be substituted or unsubstituted. For example, the $C_6$ to $C_{20}$ aromatic group-containing (meth)acrylic ester may include at least one of phenyl (meth)acrylate and benzyl (meth)acrylate.

The hydroxyl group-containing (meth)acrylic monomer may include at least one of a (meth)acrylic monomer containing a $C_1$ to $C_{20}$ alkyl group having a hydroxyl group, a (meth)acrylic monomer containing a $C_3$ to $C_{20}$ cycloalkyl group having a hydroxyl group, and a (meth)acrylic monomer containing a $C_6$ to $C_{20}$ aromatic group having a hydroxyl group. In an embodiment, the hydroxyl group-containing (meth)acrylic monomer may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 8-hydroxyhexyl (meth)acrylate, 1,4-cyclohexanedimethanol mono(meth)acrylate, 1-chloro-2-hydroxypropyl (meth)acrylate, diethyleneglycol mono(meth)acrylate, 2-hydroxy-3-phenyloxypropyl (meth)acrylate, 4-hydroxycyclopentyl (meth)acrylate, and 4-hydroxycyclohexyl (meth)acrylate. These may be used alone or in combination thereof.

The (meth)acrylic copolymer may be prepared by typical polymerization of the monomer mixture. Polymerization of the monomer mixture may be performed by a typical method known in the art. For example, the (meth)acrylic copolymer may be prepared by adding an initiator to the monomer mixture, followed by typical polymerization of the monomer mixture, for example, suspension polymerization, emulsion polymerization, solution polymerization, and the like. In an embodiment, the polymerization may be performed at about 65° C. to about 70° C. for about 6 hours to about 8 hours. As the initiator, any typical initiator including azo-based polymerization initiators and/or peroxide polymerization initiators such as benzoyl peroxide or acetyl peroxide may be used.

The (meth)acrylic copolymer may have a weight average molecular weight (Mw) of about 1,000,000 or less, and, in one embodiment, about 50,000 to about 500,000, or about 500,000 to about 1,000,000. Within this range, the composition including the (meth)acrylic copolymer can exhibit good properties in terms of pot life and coating stability. The weight average molecular weight can be measured according to gel permeation chromatography with a polystyrene standard.

The isocyanate-based curing agent can form the adhesive layer by heat curing the adhesive resin, can increase tensile modulus of the first adhesive layer, and can realize adhesive strength with respect to the polarizer subjected to corona, plasma, and/or primer treatment.

The isocyanate-based curing agent may be present in an amount of about 5 parts by weight to about 50 parts by weight, and, in one embodiment, about 5 parts by weight to about 30 parts by weight, based on 100 parts by weight of the adhesive resin. Within this range, the isocyanate-based curing agent can realize an adhesive layer having high tensile modulus and high adhesive strength together with the adhesive resin without a heat curable initiator.

The isocyanate-based curing agent may include a polyisocyanate curing agent modified with an allophanate group, thereby improving flexibility of the first adhesive layer, reducing haze of the first adhesive layer and the polarizing plate, and improving durability of the polarizing plate. For example, the isocyanate-based curing agent may be an aliphatic polyisocyanate curing agent modified with an allophanate group. In an embodiment, the aliphatic polyisocyanate curing agent includes $C_4$ to $C_{20}$ diisocyanates, such as tetramethylene diisocyanate, hexamethylene diisocyanate, dodecamethylene diisocyanate, trimethylhexamethylene diisocyanates including 2,2,4-trimethylhexamethylene diisocyanate, and the like. The polyisocyanate curing agent modified with the allophanate group may be obtained from commercially available products.

The composition for the first adhesive layer may be a solvent-free composition or may further include a solvent in order to improve coatability, paintability, or processability. The solvent may include methylethylketone, methylisobutylketone, and/or propylene glycol monomethyl ether acetate, without being limited thereto.

The composition for the first adhesive layer may further include additives. The additives can provide additional functions to the first adhesive layer. In an embodiment, the additives may include a UV absorbent, a reaction inhibitor, an adhesion promoter, a thixotrople agent, a conductivity imparting agent, a color regulator, a stabilizer, an antistatic agent, an antioxidant, and/or a leveling agent, without being limited thereto.

The composition for the first adhesive layer may further include fine particles to further improve hardness and mechanical strength of the first adhesive layer. The fine particles may include at least one of silica, aluminum oxide, zirconium oxide, and titanium oxide, without being limited thereto. The fine particles may be partially or entirely surface-treated with an epoxy group, a (meth)acrylate group or a vinyl group in order to improve compatibility. The fine particles may have any shape and size without limitation. In an embodiment, the fine particles may include particles having circular, flake, amorphous shapes, and the like. The fine particles may have an average particle diameter (D50) of about 1 nm to about 400 nm, and, in one embodiment, about 8 nm to about 100 nm. Within this range, the fine particles can improve hardness of the first adhesive layer without adverse effects on surface roughness and transparency of the first adhesive layer.

In the composition for the first adhesive layer, the fine particles may be present in an amount of about 3 wt % to about 30 wt %, and, in one embodiment, about 5 wt % to about 20 wt %, in terms of solid content. Within this range, the fine particles can increase hardness of the first adhesive layer without affecting surface roughness and transparency.

The composition for the first adhesive layer may have a viscosity at 25° C. of about 5 cP to about 200 cP, and, in one embodiment, about 10 cP to about 150 cP. Within this range, the composition can easily form the first adhesive layer.

A polarizing plate according to another embodiment of the present invention will be described with reference to FIG. 2. FIG. 2 is a cross-sectional view of a polarizing plate according to another embodiment of the present invention.

Referring to FIG. 2, a polarizing plate 200 according to another embodiment of the present invention may include a polarizer 110, a protective layer 120, a first adhesive layer 130, and a second adhesive layer 140. The polarizing plate 200 according to this embodiment is substantially the same as the polarizing plate 100 described above except for the second adhesive layer 140. The second adhesive layer 140 and a method of manufacturing the polarizing plate 200 according to this embodiment will be described further below.

The second adhesive layer 140 is "directly formed" on a lower surface of the first adhesive layer 130. With this structure, the polarizing plate can achieve thickness reduction. As used herein, the expression "directly formed" means that there is no adhesive layer and/or no bonding layer interposed between the first adhesive layer 130 and the second adhesive layer 140. The first adhesive layer 130 includes an adhesive resin having a glass transition temperature of about 50° C. or greater. Accordingly, the first adhesive layer 130 and the second adhesive layer 140 can be formed by concurrent (e.g., simultaneous) coating, and roundness at an interface between the first adhesive layer 430 and the second adhesive layer 140 can be minimized or reduced, thereby improving light transmittance of the polarizing plate. Formation through concurrent (e.g., simultaneous) coating will be described below in more detail.

The second adhesive layer 140 has a lower tensile modulus than the first adhesive layer 130 and thus provides good stress relief. Accordingly, the second adhesive layer 140 can secure durability upon fracture or severe conditions in reworking and can facilitate adhesion of the polarizing plate 200 to a liquid crystal display panel. Furthermore, the second adhesive layer 140 can prevent or substantially prevent generation of cracks in the polarizer by stress relief with respect to physical variation of the polarizer through shrinkage or expansion of the polarizer even under high temperature and/or high humidity conditions, and can improve durability by improving wettability with respect to the liquid crystal display panel. The polarizing plate 200 includes adhesive layers composed of the first adhesive layer 130 and the second adhesive layer 140 having different tensile moduli, thereby simultaneously achieving a barrier layer effect, durability improvement, and thickness reduction of the polarizing plate.

In an embodiment the second adhesive layer 140 may have a tensile modulus of about 0.01 MPa to less than about 1 MPa, and, in one embodiment, about 0.05 MPa to about 0.15 MPa, for example, about 0.05 MPa to about 0.1 MPa. Within this range, the second adhesive layer 140 can secure stress relief with respect to physical variation of the polarizer through shrinkage or expansion of the polarizer.

The second adhesive layer 140 has lower peel strength than the first adhesive layer 130. Accordingly, the second adhesive layer 140 can prevent or substantially prevent generation of cracks in the polarizer by stress relief with respect to physical variation of the polarizer through shrinkage or expansion of the polarizer even under high temperature and/or high humidity conditions, and can improve durability by improving wettability with respect to the liquid crystal display panel. In an embodiment, the second adhesive layer 140 may have a glass peel strength of about 100 gf/inch to about 1,000 gf/inch, and, in one embodiment, about 200 gf/inch to about 800 gf/inch, and, in one embodiment, about 200 gf/inch to about 700 gf/inch.

In an embodiment, the second adhesive layer 140 has a greater thickness than the first adhesive layer 130, thereby providing a stress relief effect upon shrinkage or expansion of the polarizer while improving glass peel strength. The second adhesive layer 140 may have a thickness of about 15 µm to about 39 µm, and, in one embodiment, about 15 µm to about 25 µm. Within this thickness range, the second adhesive layer 140 can improve processability and durability of the polarizing plate.

A total thickness of the first adhesive layer 130 and the second adhesive layer 140 may be in a range from about 20 µm to about 40 µm, and, in one embodiment about 25 µm to about 40 µm. Within this thickness range, the polarizing plate can exhibit good cuttability.

The second adhesive layer 140 may be formed of a composition for the second adhesive layer. The composition for the second adhesive layer will be described further below.

The composition for the second adhesive layer includes a (meth)acrylic copolymer and a coring agent.

The (meth)acrylic copolymer may have a weight average molecular weight of about 1,000,000 or less, and, in one embodiment, about 200,000 to about 1,000,000, and a glass transition temperature of about −50° C. to about −30° C., and, in one embodiment, about −50° C. to about −40° C. Within these ranges, the composition including the (meth) acrylic copolymer can secure stress relief upon shrinkage or expansion of the polarizer.

The (meth)acrylic copolymer may include a (meth)acrylic copolymer of a monomer mixture including an alkyl group-containing (meth)acrylic monomer and a hydroxyl group-containing (meth)acrylic monomer.

The alkyl group-containing (meth)acrylic monomer may include an unsubstituted or substituted $C_1$ to $C_{20}$ alkyl group-containing (meth)acrylic ester. In an embodiment, the alkyl group-containing (meth)acrylic monomer may include at least one selected from among ethyl (meth)acrylate, propyl (meth)acrylate, N-butyl (meth)acrylate, pentyl (meth)acrylate, and 2-ethylhexyl (meth)acrylate. These may be used alone or in combination thereof.

The hydroxyl group-containing (meth)acrylic monomer may include a (meth)acrylic ester containing a $C_1$ to $C_{20}$ alkyl group having at least one hydroxyl group. In an embodiment, the hydroxyl group-containing (meth)acrylic monomer may include at least one of 2-hydroxyethyl (meth)acrylate, 3-hydroxypropyl (meth)acrylate, and 4-hydroxybutyl (meth)acrylate. These may be used alone or in combination thereof.

The monomer mixture may include about 70 parts by weight to about 99 parts by weight of the alkyl group-containing (meth)acrylic monomer, and, in one embodiment, about 75 parts by weight to about 90 parts by weight of the alkyl group-containing (meth)acrylic monomer, about 1 part by weight to about 30 parts by weight of the hydroxyl group-containing (meth)acrylic monomer, and, in one embodiment, about 10 parts by weight to about 25 parts by weight of the hydroxyl group-containing (meth)acrylic monomer in terms of solid content. Within this range, the composition including the monomer mixture can exhibit high adhesion with respect to the first adhesive layer and an adherend, for example, a glass plate of a liquid crystal panel. The expression "in terms of solid content" means the total weight of remaining components of the monomer mixture excluding the solvent.

The (meth)acrylic copolymer may be prepared by a typical method. In an embodiment, the (meth)acrylic copolymer may be prepared by adding an initiator to the monomer mixture, followed by reacting at about 50° C. to about 100° C. The initiator may be 2,2'-azobisisobutyronitrile (AIBN), without being limited thereto. The initiator may be present in an amount of about 0.01 parts by weight to about 1 part by weight based on 100 parts by weight of the monomer mixture. Within this range, the (meth)acrylic copolymer can be produced at high yield.

The (meth)acrylic copolymer may further include at least one of a typical alicyclic group-containing (meth)acrylic monomer, an aromatic group-containing (meth)acrylic monomer, and a carboxylic acid group containing monomer as well as the alkyl group-containing (meth)acrylic monomer and the hydroxyl group-containing (meth)acrylic monomer.

The curing agent serves to cure the (meth)acrylic copolymer and may include a typical isocyanate curing agent, an epoxy curing agent, an imine curing agent, a metal chelate curing agent, or a carbodiimide curing agent. In an embodiment, the curing agent may include at least one selected from among hexamethylene diisocyanate, toluene diisocyanate (TDI), xylene diisocyanate, isophorone diisocyanate, naphthalene diisocyanate, and an adduct of trimethylolpropane-modified toluene diisocyanate. The curing agent may be present in an amount of about 0.1 parts by weight to about 1 part by weight, and, in one embodiment, about 0.1 parts by weight to about 0.5 parts by weight, based on 100 parts by weight of the (meth)acrylic copolymer. Within this range, the composition can be sufficiently crosslinked, thereby exhibiting adhesive effects.

The adhesive composition for the second adhesive layer may further include at least one of a silane coupling agent and a crosslinking catalyst.

The silane coupling agent can increase adhesive strength of the second adhesive layer formed of the adhesive composition. The silane coupling agent may be an epoxy group-containing silane coupling agent such as glycidoxypropyltrimethoxysilane, glycidoxypropylmethyldimethoxysilane, and the like. The silane coupling agent may be present in an amount of about 0.1 parts by weight to about 5 parts by weight based on 100 parts by weight of the (meth)acrylic copolymer. Within this range, the silane coupling agent can increase adhesive strength of the adhesive composition. The crosslinking catalyst can Improve the degree of crosslinking of an adhesive layer formed of the adhesive composition. The crosslinking catalyst may include at least one of a metal or a metal-containing compound. In an embodiment, the crosslinking catalyst may include at least one of tin-containing compounds, zinc-containing compounds, titanium compounds, and bismuth compounds. In an embodiment, the crosslinking catalyst may include at least one of dibutyltin dilaurate and tin dimaleate. The crosslinking catalyst may be present in an amount of about 0.01 parts by weight to about 1.5 parts by weight based on 100 parts by weight of the (meth)acrylic copolymer. Within this range, the crosslinking catalyst can increase the degree of crosslinking of the adhesive composition while suppressing moisture infiltration.

A method of manufacturing a polarizing plate according to an embodiment of the present invention will be described.

A method of manufacturing a polarizing plate according to an embodiment of the present invention may include: laminating a polarizer having at least one surface subjected to at least one of corona treatment, plasma treatment, and primer treatment and including a protective layer formed on the other surface thereof with a sheet for a first adhesive layer; and curing the sheet for the first adhesive layer.

For example, one surface of the polarizer or one surface of a film type protective layer to be attached to the polarizer may be subjected to at least one of corona treatment plasma treatment, and primer treatment. A water-based bonding agent or a photocurable bonding agent may be applied to the one surface of the polarizer or the protective layer. In addition, the other surface of the polarizer may be subjected to at least one of corona treatment, plasma treatment, and primer treatment in order to improve peel strength between the polarizer and the first adhesive layer. Particularly, corona treatment and plasma treatment activate a hydroxyl group in a polyvinyl alcohol film, which forms the polarizer, to react with the isocyanate-based curing agent, thereby improving peel strength of the first adhesive layer to the polarizer. Corona treatment may be performed at about 50 doses to about 150 doses. Within this range, corona treatment can easily secure adhesive strength without affecting polarization effects of the polarizer. Plasma treatment may be performed on the surface of the polarizer by supplying nitrogen or argon gas tinder vacuum or atmospheric pressure to generate plasma using electric discharge. Primer treatment may be performed by depositing a primer solution to one surface of the protective layer (the protective film) or the first adhesive layer. The primer may include at least one of a polyester resin, a polyvinyl acetate resin, and a polyurethane resin.

The sheet for the first adhesive layer may be manufactured by coating the composition for the first adhesive layer onto a release film, followed by drying. Drying may be performed at about 30° C. to about 150° C. for about 1 minute to about 2 hours.

Thereafter, the one surface of the polarizer is laminated with the sheet for the first adhesive layer, followed by curing. Curing may include heat curing and room temperature curing as described above.

It should be understood that a protective film may be formed on the other surface of the polarizer, after laminating the sheet for the first adhesive layer with the one surface of the polarizer subjected to at least one of corona, plasma, and primer treatment, followed by curing.

A method of manufacturing a polarizing plate according to another embodiment of the present invention will be described.

The method of manufacturing a polarizing plate according to another embodiment of the present invention may include forming a stack structure including a sheet for a second adhesive layer and a sheet for a first adhesive layer formed thereon by concurrently (e.g., simultaneously) coating the composition for the second adhesive layer and the composition for the first adhesive layer, followed by drying; laminating the sheet for the first adhesive layer with a polarizer, followed by curing the sheet for the second adhesive layer and the sheet for the first adhesive layer.

The method of manufacturing a polarizing plate according to another embodiment of the present invention will be described with reference to FIG. 3.

Figure 3:
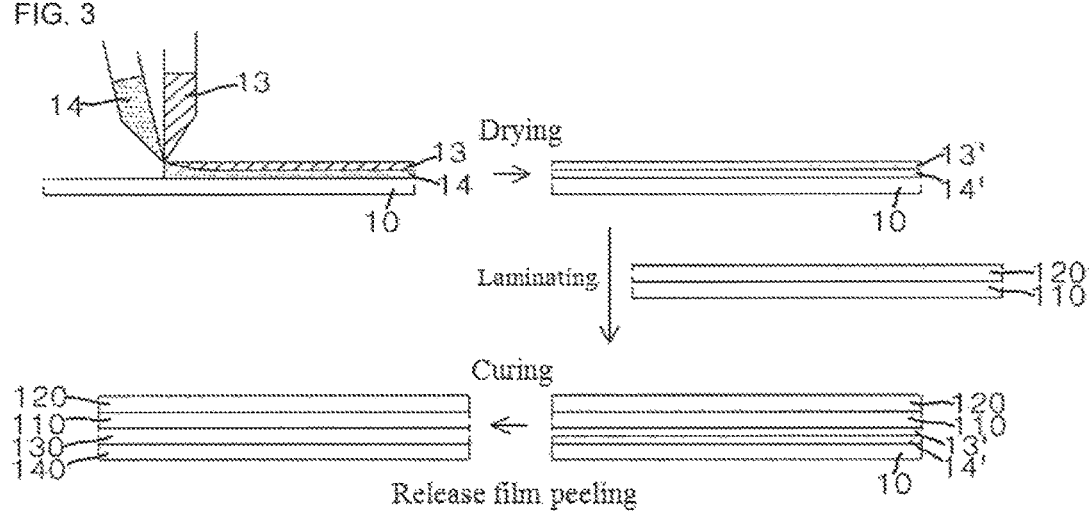
FIG. 3 is a flow diagram of a method of manufacturing a polarizing plate according to another embodiment of the present invention.

Referring to FIG. 3, a composition for a second adhesive layer 14 and a composition for a first adhesive layer 13 are concurrently (e.g., simultaneously) coated onto a release film 10. As used herein, concurrent or simultaneous coating means a process of directly coating the composition for the first adhesive layer onto the composition for the second adhesive layer without drying the composition for the second adhesive layer after coating the composition for the second adhesive layer. Coating may be performed by any method without limitation. For example, coating may be performed by bar coating, die coating, or the like. Concurrent or simultaneous coating may be performed in a state that a coating containing the composition for the second adhesive layer contacts a coater containing the composition for the first adhesive layer. In this way, the composition for the second adhesive layer and the composition for the first adhesive layer are concurrently or simultaneously coated, thereby reducing manufacturing costs while improving adhesion between the first adhesive layer and the second adhesive layer.

Although not shown in FIG. 3, coating may be performed under vacuum such as in a vacuum box. In addition, although not shown in FIG. 3, the release film may be moved on a roll, thereby improving processability.

Thereafter, the composition for the second adhesive layer 14 and the composition for the first adhesive layer 13 concurrently or simultaneously coated onto the release film 10 are dried to form a stack structure in which a sheet 131 for the first adhesive layer and a sheet 14' for the second adhesive layer are formed on the release film 10. Drying is performed at 30° C. to 150° C. for 1 minute to 2 hours. Thereafter, the polarizer 110 on which the protective layer 120 is formed is combined, such as by laminating, with the sheet 13' for the first adhesive layer and then dried or cured, thereby providing a polarizing plate as shown in FIG. 2.

Although not shown in FIG. 3, the polarizer may be subjected to at least one of corona treatment, plasma treatment, and primer treatment before laminating with the sheet for the first adhesive layer. Corona, plasma or primer treatment can improve adhesion between the polarizer and the sheet for the first adhesive layer. Curing may include at least one of heat curing and room temperature curing as described above.

A method of manufacturing a polarizing plate according to a further embodiment of the present invention may include: coating and drying a composition for a second adhesive layer to prepare a sheet for the second adhesive layer; coating and drying a composition for a first adhesive layer on the sheet for the second adhesive layer to form a stack structure in which the sheet for the first adhesive layer and the sheet for the second adhesive layer are formed; and laminating the sheet for the first adhesive layer with a polarizer, followed by drying. The method according to this embodiment is substantially the same as the method according to the embodiment described above except that the composition for the first adhesive layer is coated and dried after forming the sheet for the second adhesive layer.

A device for optical displays according to one or more embodiments may include the polarizing plate according to one of the embodiments of the present invention, and a film formed on an upper surface of the polarizing plate and Including quantum dots. The film can improve color reproduction and visibility.

An optical display according to one or more embodiments may include the polarizing plate according to one of the embodiments of the present invention. The optical display may include a liquid crystal display, an organic light emitting display, and a flexible organic light emitting display, without being limited thereto. The optical display may include a visibility improving film including quantum dots to improve color reproduction and visibility.

Hereinafter, some aspects of the present invention will be described in more detail with reference to some examples. However, it should be understood that these examples are provided for illustration only and are not to be construed in any way as limiting the present invention.

Details of components used in some Examples and Comparative Examples are as follows.

(A) Composition for first adhesive layer (A1) Adhesive resin: 1335B (glass transition temperature: 50° C. Samhwa Co., Ltd.)

(A2) Adhesive resin: 1335F (glass transition temperature: 30° C. Samhwa Co., Ltd.)

(A3) Isocyanate-based curing agent: AE700-100 (hexamethylene diisocyanate modified with allophanate group, Asahi Kases Chemical Co.)

(A4) Isocyanate-based curing agent: TDI (toluene diisocyanate) based curing agent (Coronate L, not containing allophanate group, Japan Urethane Co., Ltd.)

(B) Composition for second adhesive layer (B1) (Meth)acrylic copolymer; (Meth)acrylic copolymer of 80 wt % butyl acrylate and 20 wt % 2-hydroxyethyl acrylate (weight average molecular weight; 1,000,000, glass transition temperature: −50° C.)

(B2) Curing agent: Coronate L (Japan Urethane Co., Ltd.)

(B3) Silane coupling agent: KBM403 (Shin-Etsu Chemical Co., Ltd.)

(C) Protective film: normal TAG film (KC4DR-1, thickness; 40 μm, Konica Co., Ltd.)

(D) Water-based bonding agent Prepared by mixing 3.5 parts by weight of polyvinyl alcohol powder (2-320, Nippon Synthetic IND), 1 part by weight of polyethyleneimide (Nippon Shokubai Co., Ltd.), and 0.1 parts by weight of zirconium oxide (Nippon Rare Element Co., Ltd.) with 100 parts by weight of water.

Example 1

A composition for a first adhesive layer was prepared by mixing 100 parts by weight of the (A1) adhesive resin and 30 parts by weight of the (A3) isocyanate-based curing agent. A composition for a second adhesive layer was prepared by mixing 100 parts by weight of the (B1) (meth) acrylic copolymer, 0.2 parts by weight of the (B2) curing agent and 0.1 parts by weight of the (B3) silane coupling agent. The composition for the second adhesive layer and the composition for the first adhesive layer were concurrently (e.g., simultaneously) coated onto a polyethylene terephthalate (PET) release film, and dried at 90° C. for 30 minutes, thereby preparing a stack sheet in which a sheet for the second adhesive layer and a sheet for the first adhesive layer are sequentially stacked on the PET release film.

A polyvinyl alcohol film (degree of saponification: 99.5 mol %, degree of polarization: 2,000, thickness: 80 μm, Kuraray Co., Ltd.) was dyed in a 0.3% iodine solution. Then, the film was stretched to an elongation of 5.0 in one axial direction. The stretched polyvinyl alcohol was dipped in a 3% boric acid solution and a 2% potassium iodide solution for color correction. Thereafter, the film was dried at 50° C. for 4 minutes, thereby manufacturing a polarizer (thickness: 12 μm).

The (C) protective film was bonded to one surface of the polarizer using the (D) water-based bonding agent and the other surface of the polarizer was subjected to corona treatment at 50 doses. The sheet for the first adhesive layer of the stack sheet was laminated with the surface of the polarizer subjected to corona treatment, and was subjected to curing at 35° C. and 45% RH, followed by removing the PET film, thereby manufacturing a polarizing plate.

Example 2 to Example 5

A polarizing plate was manufactured in the same manner as in Example 1 except that the amounts of the components for the composition for the first adhesive layer were changed as listed in Table 1.

Example 6

A polarizing plate was manufactured in the same manner as in Example 3 except that the thickness of each of the first adhesive layer and the second adhesive layer was changed as listed in Table 1.

Example 7

A polarizing plate was manufactured in the same manner as in Example 1 except that the thickness of each of the polarizer, the first adhesive layer, and the second adhesive layer was changed as listed in Table 1.

A composition for the first adhesive layer was prepared by mixing 100 parts by weight of the (A2) adhesive resin and 30 parts by weight of the (A3) isocyanate-based curing agent. A polarizing plate was manufactured in the same manner as in Example 1 using the prepared composition for the first adhesive layer.

A composition for the first adhesive layer was prepared by mixing 100 parts by weight of the (A1) adhesive resin and 30 parts by weight of the (A4) isocyanate-based curing agent. A polarizing plate was manufactured in the same manner as in Example 1 using the prepared composition for the first adhesive layer.

Components of each of the polarizing plates manufactured in the Examples and Comparative Examples are shown in Tables 1 and 2. The first adhesive layer, the second adhesive layer, and the polarizing plate were evaluated as to the following (1) to (8) properties discussed below, and results are shown in Tables 1 and 2.

TABLE 1

| Item | | | Example | | | | | | |
|---|---|---|---|---|---|---|---|---|---|
| | | | 1 | 2 | 3 | 4 | 5 | 6 | 7 |
| (A) | (A1) | | 100 | 100 | 100 | 100 | 100 | 100 | 100 |
| | (A2) | | — | — | — | — | — | — | — |
| | (A3) | | 30 | 20 | 15 | 10 | 5 | 15 | 30 |
| | (A4) | | — | — | — | — | — | — | — |
| (B) | (B1) | | 100 | 100 | 100 | 100 | 100 | 100 | 100 |
| | (B2) | | 0.2 | 0.2 | 0.2 | 0.2 | 0.2 | 0.2 | 0.2 |
| | (B3) | | 0.1 | 0.1 | 0.1 | 0.1 | 0.1 | 0.1 | 0.1 |
| Thickness of polarizer (μm) | | | 12 | 12 | 12 | 12 | 12 | 12 | 18 |
| Thickness of adhesive layer (μm) | First adhesive layer | | 10 | 10 | 10 | 10 | 10 | 15 | 8 |
| | Second adhesive layer | | 15 | 15 | 15 | 15 | 15 | 25 | 20 |
| Peel strength (gf/inch) | First adhesive layer | | 1684 | 1602 | 1564 | 1514 | 1418 | 1584 | 1628 |
| | Second adhesive layer | | 250 | 250 | 250 | 250 | 250 | 650 | 450 |

TABLE 1-continued

| Item | | Example 1 | 2 | 3 | 4 | 5 | 6 | 7 |
|---|---|---|---|---|---|---|---|---|
| Tensile modulus (MPa) | First adhesive layer | 220 | 600 | 830 | 1200 | 1405 | 830 | 220 |
| | Second adhesive layer | 0.09 | 0.09 | 0.09 | 0.09 | 0.09 | 0.09 | 0.09 |
| Haze of first adhesive layer (%) | | 0.2 | 0.2 | 0.2 | 0.1 | 0.1 | 0.2 | 0.2 |
| Haze of polarizing plate (%) | | 0.3 | 0.3 | 0.3 | 0.3 | 0.3 | 0.3 | 0.3 |
| Durability under thermal impact | | ○ | ○ | ○ | ○ | ○ | ○ | ○ |
| Durability under high temperature/high humidity | | ○ | ○ | ○ | ○ | ○ | ○ | ○ |

TABLE 2

| Item | | Comparative Example 1 | 2 |
|---|---|---|---|
| (A) | (A1) | — | 100 |
| | (A2) | 100 | — |
| | (A3) | 30 | — |
| | (A4) | — | 30 |
| (B) | (B1) | 100 | 100 |
| | (B2) | 0.2 | 0.2 |
| | (B3) | 0.1 | 0.1 |
| Thickness of polarizer (μm) | | 12 | 12 |
| Thickness of adhesive layer (μm) | First adhesive layer | 10 | 10 |
| | Second adhesive layer | 15 | 15 |
| Peel strength (gf/inch) | First adhesive layer | 1712 | 98 |
| | Second adhesive layer | 250 | 250 |
| Tensile modulus (MPa) | First adhesive layer | 150 | 452 |
| | Second adhesive layer | 0.09 | 0.09 |
| Haze of first adhesive layer (%) | | 0.3 | 27.6 |
| Haze of polarizing plate | | 0.4 | 28 |
| Durability under thermal impact | | x | x |
| Durability under high temperature/high humidity | | x | x |

As shown in Tables 1 and 2, each of the polarizing plates of the Examples had low haze and a high tensile modulus of the first adhesive layer, thereby securing good durability under thermal impact and high temperature/high humidity conditions. Accordingly, embodiments of the present invention provide a polarizing plate that includes a protective layer formed only on one surface of a polarizer and exhibits good durability upon fracture or severe conditions in reworking. Embodiments of the present invention provide a polarizing plate that includes the protective layer formed only on one surface of the polarizer and prevents or substantially prevents generation of cracks in the polarizer and/or discoloration of the polarizer under high temperature and/or high humidity conditions or under thermal impact conditions. Further, embodiments of the present invention provide a polarizing plate that includes the protective layer formed only on one surface of the polarizer and an adhesive layer having high tensile modulus, which is obtained through heat curing without using a heat curable initiator. Embodiments of the present invention provide a polarizing plate that includes the protective layer formed only on one surface of the polarizer and exhibits good flexibility to be used in a flexible display. Embodiments of the present invention also provide an optical display including the polarizing plate as set forth herein.

By contrast, the polarizing plate of Comparative Example 1, which included an adhesive resin having a glass transition temperature of less than 50° C., exhibited poor durability. In addition, in the polarizing plate of Comparative Example 2, which did not include the curing agent modified with the allophanate group, both the first adhesive layer and the polarizing plate exhibited high haze values.

(1) Peel strength: Each of the first adhesive layer and the second adhesive layer was measured as to 180° peel strength with respect to a glass substrate in accordance with JIS2107 at 25° C. The first adhesive layer was cut into a size of 100 mm×25 mm (length×width) and laminated onto a glass substrate to prepare a specimen. The first adhesive layer and the glass substrate of the specimen were connected to upper and lower jigs of a tensile testing machine (Texture Analyzer), followed by peeling the first adhesive layer from the glass substrate at a tensile speed of 300 mm/min at an angle of 180° to measure load upon peeling. Peel strength of the second adhesive layer was measured by the same method as in measurement of peel strength of the first adhesive layer. Peel strength of the second adhesive layer is an average value and, since the second adhesive layer is a soft type adhesive layer, there can be a deviation of peel strength of the second adhesive layer from the average peel strength.

(2) Tensile modulus; Tensile modulus of each of the first adhesive layer and the second adhesive layer was measured by a stress-strain testing method in accordance with ASTM D882 at 25° C. The composition for the first adhesive layer was coated in a predetermined area on a release film and dried at 90° C. for 30 minutes, and then the release film was removed from the specimen, thereby preparing a first adhesive layer having a thickness of 35 μm. The prepared first adhesive layer was cut to a specimen having a size of 200 mm×5 mm (length×width). With both ends of the specimen secured to jigs of a tensile testing machine, tensile modulus was measured under the following conditions. The measurement conditions of tensile modulus are as follows:
Measurement conditions for tensile modulus;
Testing machine: Universal Testing Machine (UTM):
Model: Texture analyzer available from Stable Micro Systems Co., Ltd.;
Measurement conditions: Load ceil: 300 N, Tensile speed: 6 mm/sec.

(3) Haze of first adhesive layer: Each of the compositions for the first adhesive layer prepared in the Examples and Comparative Examples was coated to a predetermined thickness on a release film and dried at 90° C. for 30 minutes, thereby preparing a specimen for each of the first adhesive layers of the Examples and Comparative Examples. The release film was removed from the specimen, thereby preparing a first adhesive layer. Haze of the first adhesive layer was measured using a hazemeter (NDH-5000, Nippon Densuoku Co., Ltd.) at a wavelength of 380 nm to 780 nm.

(4) Haze of polarizing plate: Haze of each of the polarizing plates of Examples and Comparative Examples was measured using a hazemeter (NDH-5000, Nippon Densuoku Co., Ltd.) at a wavelength of 380 nm to 780 nm.

(5) Durability under thermal impact conditions: A specimen was prepared by laminating a polarizing plate having a size of 175 mm×100 mm (length×width) on a glass substrate, followed by applying a pressure of 4 kg to 5 kg to the polarizing plate. The specimen was subjected to 200 cycles of thermal impact each of which included leaving the specimen at −40° C. for 30 minutes, heating the specimen from −40° C. to 80° C., and leaving the specimen at 80° C. for 30 minutes. The specimen was left at room temperature for 1 hour or more and evaluated with the naked eye or a microscope. Generation of no cracks or bubbles in the polarizing plate or no cracks in the polarizer was evaluated as ○, slight generation of bubbles or cracks or slight gene of cracks in the polarizer was evaluated as Δ, and generation of severe cracks was evaluated as x.

(6) Durability under high temperature/high humidity conditions; A specimen was prepared by the same method as in (5). The specimen was left under conditions of 60° C. and 95% RH for 500 hours. The specimen was left at room temperature for 1 hour or more and evaluated with the naked eye or a microscope. Generation of no cracks or bubbles in the polarizing plate was evaluated as ○, slight generation of bubbles or cracks was evaluated as Δ, and generation of severe cracks was evaluated as x.

It should be understood that various modifications, changes, alterations, and equivalent embodiments can be made by those skilled in the art without departing from the spirit and scope of the invention.

What is claimed is:

1. A polarizing plate comprising: a polarizer and a first adhesive layer formed on a lower surface of the polarizer, wherein the first adhesive layer comprises an adhesive resin having a glass transition temperature of about 50° C. or greater, and the first adhesive layer has a haze of about 1% or less at a wavelength of about 380 nm to about 780 nm, and wherein the first adhesive layer has a tensile modulus of about 10 MPa to less than about 2,000 MPa, as measured in accordance with ASTM D882.

2. The polarizing plate according to claim 1, wherein the first adhesive layer further comprises a polyisocyanate curing agent modified with an allophanate group.

3. The polarizing plate according to claim 2, wherein the polyisocyanate curing agent modified with the allophanate group is present in an amount of about 5 parts by weight to about 50 parts by weight based on 100 parts by weight of the adhesive resin.

4. The polarizing plate according to claim 2, wherein the polyisocyanate curing agent modified with the allophanate group comprises at least one of tetramethylene diisocyanate, hexamethylene diisocyanate, dodecamethylene diisocyanate, and trimethylhexamethylene diisocyanate, modified with the allophanate group.

5. The polarizing plate according to claim 1, wherein the lower surface of the polarizer is treated by at least one of corona treatment, plasma treatment, and primer treatment.

6. The polarizing plate according to claim 1, wherein the first adhesive layer is directly formed on the lower surface of the polarizer.

7. The polarizing plate according to claim 1, wherein the first adhesive layer has a thickness of about 5 μm to about 40 μm.

8. The polarizing plate according to claim 1, further comprising: a protective layer formed on an upper surface of the polarizer.

9. An optical display comprising the polarizing plate according to claim 1.

10. A polarizing plate comprising: a polarizer, a first adhesive layer formed on a lower surface of the polarizer, and a second adhesive layer formed on a lower surface of the first adhesive layer,
wherein the first adhesive layer comprises an adhesive resin having a glass transition temperature of about 50° C. or greater, and the first adhesive layer has a haze of about 1% or less at a wavelength of about 380 nm to about 780 nm, and
wherein the polarizing plate has a haze of about 1% or less at a wavelength of about 380 nm to about 780 nm.

11. The polarizing plate according to claim 10, wherein the second adhesive layer has a lower tensile modulus than the first adhesive layer, as measured in accordance with ASTM D882.

12. The polarizing plate according to claim 11, wherein the second adhesive layer has a tensile modulus of about 0.01 MPa to less than about 1 MPa, as measured in accordance with ASTM D882.

13. The polarizing plate according to claim 10, wherein the second adhesive layer has a greater thickness than the first adhesive layer.

* * * * *